No. 669,143. Patented Mar. 5, 1901.
E. MOONEY.
TRACTION WHEEL.
(Application filed Sept. 27, 1900.)
(No Model.)

Witnesses:
J. R. Booth
John H. Kingate

Inventor:
Emmett Mooney

UNITED STATES PATENT OFFICE.

EMMETT MOONEY, OF LA HARPE TOWNSHIP, ILLINOIS.

TRACTION-WHEEL.

SPECIFICATION forming part of Letters Patent No. 669,143, dated March 5, 1901.

Application filed September 27, 1900. Serial No. 31,296. (No model.)

*To all whom it may concern:*

Be it known that I, EMMETT MOONEY, of La Harpe township, in the county of Hancock and State of Illinois, have invented a new and useful Improvement in Traction-Wheels, of which the following is a full, clear, and exact description.

This invention relates more particularly to wheels for traction-engines or similar vehicles; and the object is to produce a traction-wheel that will clean itself of mud and will not slip on soft roads and will run smooth on hard roads or bridges.

I will describe a traction-wheel embodying my invention and point out the novel features in the appended claim.

Reference is to be had to the accompanying drawings, forming a part of this specification, in which similar characters of reference indicate corresponding parts in the views.

Figure 1:
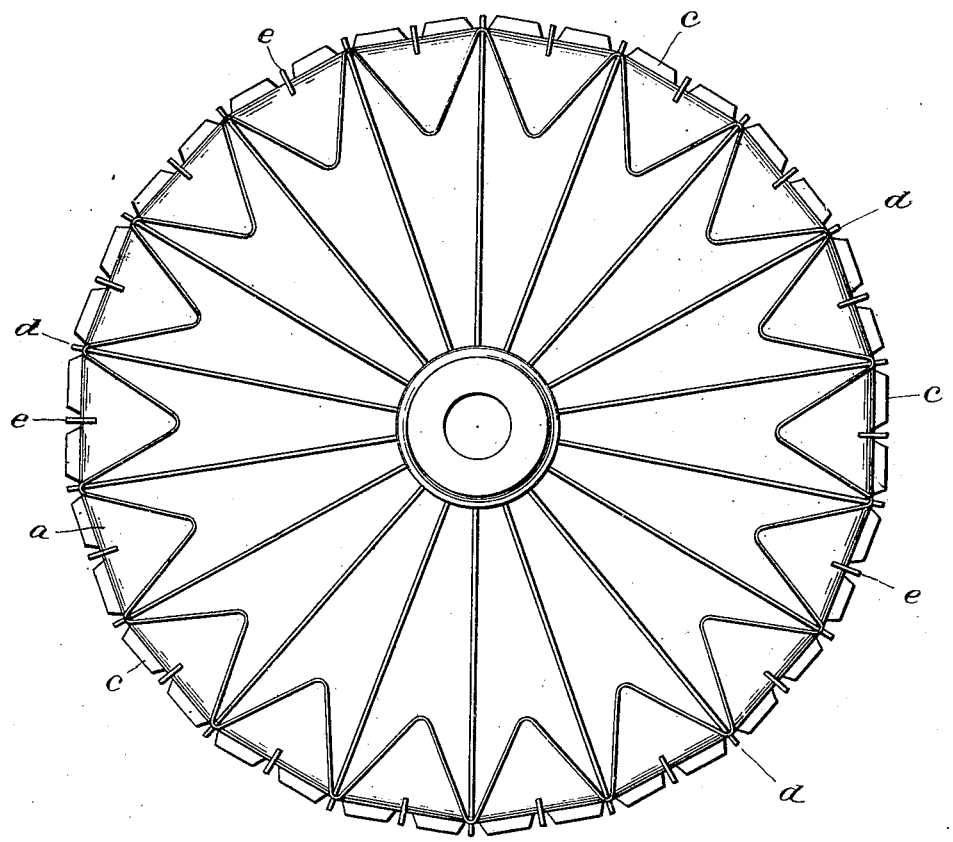
Figure 2:
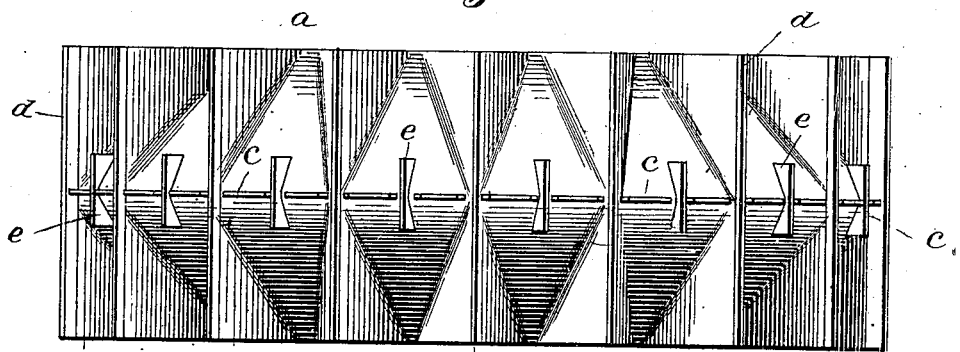

Figure 1 is a side elevation of a traction-wheel embodying my invention. Fig. 2 is a top plan view thereof.

My invention relates only to the rim of the wheel and has no working parts to get out of order.

Referring to the side view, *a* designates the rim of the traction-wheel where it swags in a corrugated style from the center of the rim toward the hub. This allows the mud to work out from under the wheel when the mud is not deep and lets the lugs get a hold in the hard ground.

*d* represents a lug which runs direct across the rim of the wheel and the full width of the rim. This lug is to catch in the earth and hold when the ground is loose or plowed or in sand or in hard ground.

The letter *e* represents a short lug running in the same direction as the long lug, but is only one-fourth as long as the long lug. This lug is to catch in the earth when the ground is solid or hard. These lugs are to be placed one or more between the long lugs in the center of the rim.

The letter *c* represents a lug running around the wheel in the center of the rim and placed between the other lugs. These lugs are only to sink in the hard ground and keep the wheel from sliding sidewise.

This wheel should be a little larger in the center of the rim than at the outer edges. This will allow the wheel to run on the center of the rim on hard ground. The long lug *d* should be placed half the width of the rim apart and the other lugs between them in the center of the rim.

Having described the construction and operation of my invention, what I claim, and desire to secure by Letters Patent, is—

A wheel with a corrugated rim full in the center and a series of long lugs swung across and full width of the rim, a series of short lugs swung in the same position between the long lugs in the center of the rim, and lugs running around the wheel in the center of the rim between the other lugs as herein shown and described.

EMMETT MOONEY.

Witnesses:
JOHN H. HUNGATE,
J. R. BOOTH.